(12) United States Patent
Burdgick et al.

(10) Patent No.: US 10,036,270 B2
(45) Date of Patent: Jul. 31, 2018

(54) STEAM TURBINE ROTOR SEAL KEY MEMBER, RELATED ASSEMBLY AND STEAM TURBINE

(71) Applicant: General Electric Company, Schenectady, NY (US)

(72) Inventors: Steven Sebastian Burdgick, Schenectady, NY (US); David Bruce Knorr, Clifton Park, NY (US); Sean Christopher Morrissey, Schenectady, NY (US); Nicholas Daniel Viscio, Voorheesville, NY (US)

(73) Assignee: General Electric Company, Schenectady, NY (US)

( * ) Notice: Subject to any disclaimer, the term of this patent is extended or adjusted under 35 U.S.C. 154(b) by 333 days.

(21) Appl. No.: 14/960,975

(22) Filed: Dec. 7, 2015

(65) Prior Publication Data

US 2017/0159473 A1    Jun. 8, 2017

(51) Int. Cl.
*F01D 11/00* (2006.01)
*F16J 15/447* (2006.01)
(Continued)

(52) U.S. Cl.
CPC .......... *F01D 11/005* (2013.01); *F01D 11/001* (2013.01); *F16J 15/3268* (2013.01);
(Continued)

(58) Field of Classification Search
CPC .. F16J 15/4472; F16J 15/3288; F16J 15/3292; F01D 11/006; F01D 11/001;
(Continued)

(56) References Cited

U.S. PATENT DOCUMENTS 3,096,074 A * 7/1963 Pratt ..................... F01D 5/3015
416/215
4,304,523 A   12/1981 Crosmeier et al.
(Continued)

FOREIGN PATENT DOCUMENTS

EP    2 554 879 A2    2/2013
EP    2 740 902 A2    6/2014

OTHER PUBLICATIONS

Extended European Search Report and Opinion issued in connection with corresponding EP Application No. 16201570.5 dated May 26, 2017.
(Continued)

*Primary Examiner* — Ninh H Nguyen
*Assistant Examiner* — Topaz L Elliott
(74) *Attorney, Agent, or Firm* — Ernest G. Cusick; Hoffman Warnick LLC

(57) ABSTRACT

Various embodiments include a rotor key member having: a body with a primary axis extending in a direction substantially perpendicular to an axial direction in a steam turbine, the body including: a first pair of opposing sides; a second pair of opposing sides extending between the first pair of opposing sides; a top surface and a bottom surface extending between the second pair of opposing sides; and a fillet, bevel or chamfer edge extending between a first one of the first pair of opposing sides and the bottom surface and extending an entire length of the body along the primary axis; and a slot within the body, the slot extending a portion of a length of the body along the primary axis between the second pair of opposing sides and forming an opening in a second one of the first pair of opposing sides.

18 Claims, 8 Drawing Sheets

(51) Int. Cl.
*F16J 15/3268* (2016.01)
*F16B 3/04* (2006.01)
*F01D 11/02* (2006.01)

(52) U.S. Cl.
CPC ........... *F16J 15/4472* (2013.01); *F01D 11/02* (2013.01); *F05D 2220/31* (2013.01); *F05D 2230/235* (2013.01); *F05D 2230/642* (2013.01); *F05D 2240/55* (2013.01); *F05D 2250/22* (2013.01); *F05D 2260/30* (2013.01); *F16B 3/04* (2013.01)

(58) Field of Classification Search
CPC . F01D 11/02; F01D 5/02; F01D 25/24; F05D 2220/31; F05D 2260/30; F05D 2240/56; F05D 2240/59; F05D 2240/55; F16B 3/04
USPC ............. 416/204 A; 277/373, 372, 366, 367; 415/173.7
See application file for complete search history.

(56) References Cited

U.S. PATENT DOCUMENTS

| | | | |
|---|---|---|---|
| 4,846,628 A * | 7/1989 | Antonellis | ............ F01D 5/3015 416/220 R |
| 5,236,302 A * | 8/1993 | Weisgerber | ............... F01D 5/06 415/173.7 |
| 5,318,405 A | 6/1994 | Meade et al. | |
| 5,320,488 A | 6/1994 | Meade et al. | |
| 5,622,475 A | 4/1997 | Hayner et al. | |
| 6,106,234 A | 8/2000 | Gabbitas | |
| 7,371,050 B2 * | 5/2008 | Pasquiet | ............... F01D 5/3015 416/204 A |
| 7,566,201 B2 | 7/2009 | Brillert et al. | |
| 8,105,041 B2 | 1/2012 | Brillert et al. | |
| 8,888,460 B2 | 11/2014 | Ahaus et al. | |
| 9,327,368 B2 | 5/2016 | Hagan | |
| 9,835,253 B2 | 12/2017 | Aksit | |
| 2012/0251303 A1 | 10/2012 | Zheng et al. | |
| 2012/0288361 A1 | 11/2012 | Lu et al. | |
| 2017/0089215 A1 | 3/2017 | Zheng et al. | |

OTHER PUBLICATIONS

Zheng, X., et al., Rotating brush seal with bristle shield, GE co-pending U.S. Appl. No. 15/237,692, filed Aug. 16, 2016.

U.S. Appl. No. 14/960,987, Office Action 1 dated Feb. 7, 2018, 15 pages.

U.S. Appl. No. 14/960,948, Office Action dated Feb. 8, 2018, 19 pages.

U.S. Appl. No. 14/960,961, Office Action dated Feb. 9, 2018, 15 pages.

U.S. Appl. No. 14/960,948, Notice of Allowance dated Jun. 6, 2018, 16 pages.

U.S. Appl. No. 14/960,987, Notice of Allowance dated Jun. 12, 2018, 10 pages.

U.S. Appl. No. 14/960,961, Notice of Allowance dated Jun. 13, 2018, 1 pages.

* cited by examiner

STEAM TURBINE ROTOR SEAL KEY MEMBER, RELATED ASSEMBLY AND STEAM TURBINE

BACKGROUND OF THE INVENTION

The subject matter disclosed herein relates to steam turbines. Specifically, the subject matter disclosed herein relates to seal devices in steam turbines.

Steam turbines include static nozzle assemblies that direct flow of a working fluid into turbine buckets connected to a rotating rotor. The nozzle construction (including a plurality of nozzles, or "airfoils") is sometimes referred to as a "diaphragm" or "nozzle assembly stage." Steam turbine diaphragms include two halves, which are assembled around the rotor, creating horizontal joints between these two halves. Each turbine diaphragm stage is vertically supported by support bars, support lugs or support screws on each side of the diaphragm at the respective horizontal joints. The horizontal joints of the diaphragm also correspond to horizontal joints of the turbine casing, which surrounds the steam turbine diaphragm.

Steam turbines utilize seals between rotor components and stator components, typically radially outward of the rotor bucket tip and radially inward of the diaphragm nozzle cover (stator). While some seals are formed as teeth on the rotor and/or stator, other configurations include a circumferential (or, rotating) seal that is located within a circumferential dovetail slot in the rotor. These rotating (circumferential) seals present unique design constraints, including, radial retention, rotation control, circumferential locking, and consistency of sealing across the circumference.

BRIEF DESCRIPTION OF THE INVENTION

Various embodiments include a rotor key member, along with a related assembly and steam turbine. Particular embodiments include a rotor key member for retaining a circumferential seal in a steam turbine, the rotor key member including: a body with a primary axis extending in a direction substantially perpendicular to an axial direction in the steam turbine, the body including: a first pair of opposing sides; a second pair of opposing sides extending between the first pair of opposing sides; a top surface and a bottom surface extending between the second pair of opposing sides; and a fillet, bevel or chamfer edge extending between a first one of the first pair of opposing sides and the bottom surface and extending an entire length of the body along the primary axis; and a slot within the body, the slot extending a portion of a length of the body along the primary axis between the second pair of opposing sides and forming an opening in a second one of the first pair of opposing sides A first aspect of the disclosure includes a rotor key member for retaining a circumferential seal in a steam turbine, the rotor key member including: a body with a primary axis extending in a direction substantially perpendicular to an axial direction in the steam turbine, the body including: a first pair of opposing sides; a second pair of opposing sides extending between the first pair of opposing sides; a top surface and a bottom surface extending between the second pair of opposing sides; and a fillet, bevel or chamfer edge extending between a first one of the first pair of opposing sides and the bottom surface and extending an entire length of the body along the primary axis; and a slot within the body, the slot extending a portion of a length of the body along the primary axis between the second pair of opposing sides and forming an opening in a second one of the first pair of opposing sides A second aspect of the disclosure includes a steam turbine rotor assembly having: a rotor body having a slot extending substantially entirely circumferentially about a primary axis of the rotor body, the slot including: a primary slot extending substantially an entire circumferential distance about the rotor body; and a secondary slot extending axially from the primary slot and spanning only a portion of the circumferential distance about the rotor body; a circumferential seal within the primary slot spanning substantially the entire circumferential distance about the rotor body; a set of seal retaining members within the primary slot contacting an axial face of the circumferential seal; and a rotor key member within the secondary slot contacting the axial face of the circumferential seal, the rotor key member for retaining the circumferential seal within the primary slot.

A third aspect of the disclosure includes a steam turbine having: a casing; and a rotor assembly at least partially contained within the casing, the rotor assembly having: a rotor body having a slot extending substantially entirely circumferentially about a primary axis of the rotor body, the slot including: a primary slot extending substantially an entire circumferential distance about the rotor body; and a secondary slot extending axially from the primary slot and spanning only a portion of the circumferential distance about the rotor body; a circumferential seal within the primary slot spanning substantially the entire circumferential distance about the rotor body; a set of seal retaining members within the primary slot contacting an axial face of the circumferential seal; and a rotor key member within the secondary slot contacting the axial face of the circumferential seal, the rotor key member for retaining the circumferential seal within the primary slot.

BRIEF DESCRIPTION OF THE DRAWINGS

These and other features of this invention will be more readily understood from the following detailed description of the various aspects of the invention taken in conjunction with the accompanying drawings that depict various embodiments of the disclosure, in which.

Figure 1:
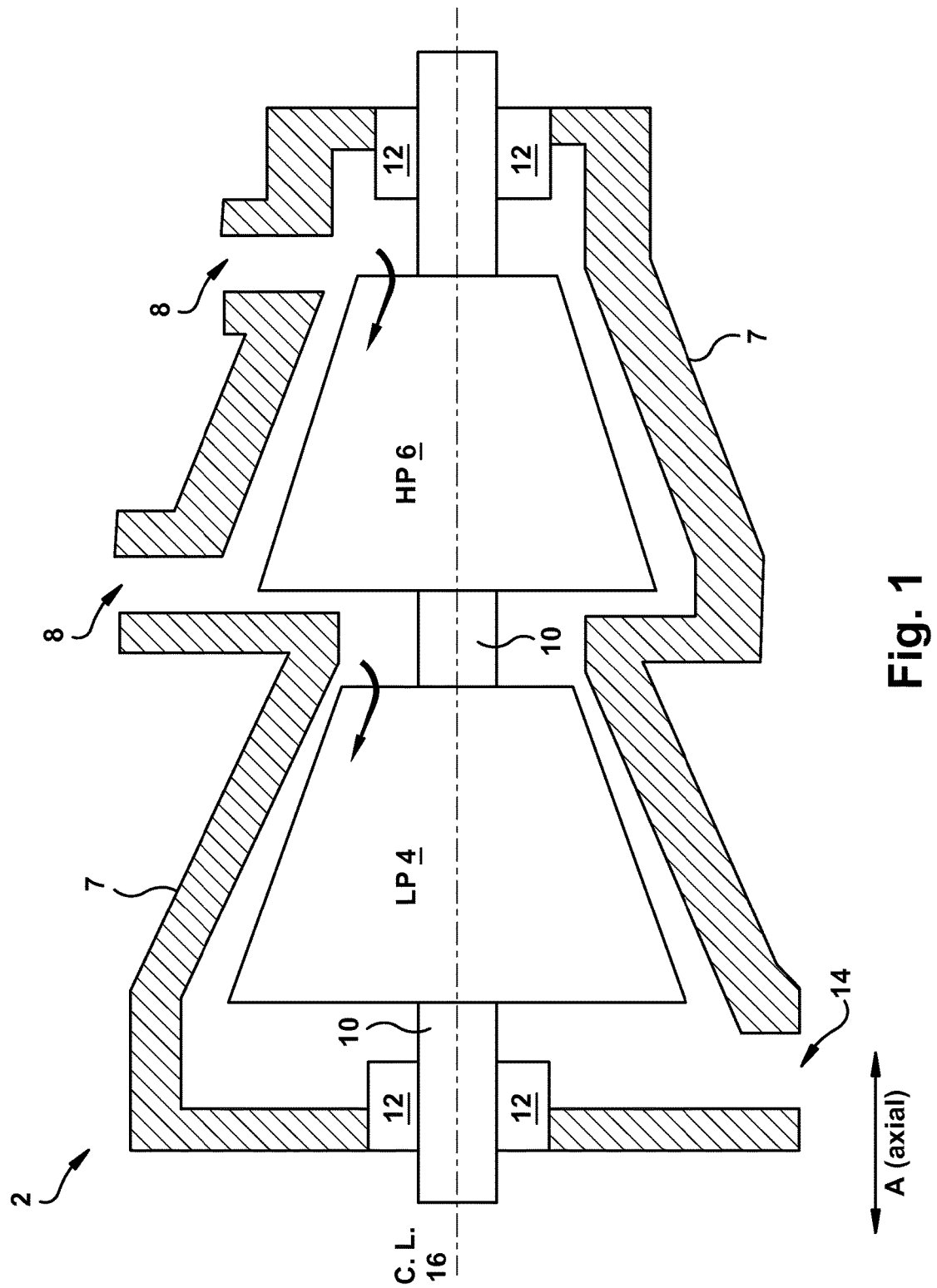
FIG. 1 shows a partial cross-sectional schematic view of steam turbine according to various embodiments.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The subject matter disclosed herein relates to steam turbines. Specifically, the subject matter disclosed herein relates to rotating seals in steam turbines.

According to various embodiments of the disclosure, a device (e.g., key member) is configured to lock/unlock a circumferential (e.g., rotatable) seal in a steam turbine, both radially retaining the seal as well as preventing rotation. Conventional approaches to retain circumferential seals allow for unwanted rotation, and are also susceptible to slipping and creep, which can both diminish the effectiveness of the seal and wear on the seal and adjacent components. In contrast to these conventional approaches, various embodiments include a key member sized to engage a key slot within the rotor body between circumferentially disposed seal retaining members, and retain an adjacent circumferential seal. The key member can include a slot, and can further include a weld substantially filling the slot and locking the key member in place within the rotor assembly. The weld can be used to connect/disconnect the key member from at least one of the rotor body, the circumferential seal, or a neighboring seal retaining member. The key member has a sufficient axial width to contact both the rotating seal and the axially facing wall of the key slot (e.g., within a recess in circumferential seal). In some cases, the key member includes a fillet, bevel chamfered edge allowing the key member to be more easily inserted into the space between the rotor body and the circumferential seal.

As denoted in these Figures, the "A" axis represents axial orientation (along the axis of the turbine rotor, sometimes referred to as the turbine centerline). As used herein, the terms "axial" and/or "axially" refer to the relative position/direction of objects along axis A, which is substantially parallel with the axis of rotation of the turbomachine (in particular, the rotor section). As further used herein, the terms "radial" and/or "radially" refer to the relative position/direction of objects along axis (r), which is substantially perpendicular with axis A and intersects axis A at only one location. Additionally, the terms "circumferential" and/or "circumferentially" refer to the relative position/direction of objects along a circumference (c) which surrounds axis A but does not intersect the axis A at any location. Identically labeled elements in the Figures depict substantially similar (e.g., identical) components.

Turning to FIG. 1, a partial cross-sectional schematic view of steam turbine 2 (e.g., a high-pressure/intermediate-pressure steam turbine) is shown. Steam turbine 2 may include, for example, a low pressure (LP) section 4 and a high pressure (HP) section 6 (it is understood that either LP section 4 or HP section 6 can include an intermediate pressure (IP) section, as is known in the art). The LP section 4 and HP section 6 are at least partially encased in casing 7. Steam may enter the HP section 6 and LP section 4 via one or more inlets 8 in casing 7, and flow axially downstream from the inlet(s) 8. In some embodiments, HP section 6 and LP section 4 are joined by a common shaft 10, which may contact bearings 12, allowing for rotation of the shaft 10, as working fluid (steam) forces rotation of the blades within each of LP section 4 and HP section 6. After performing mechanical work on the blades within LP section 4 and HP section 6, working fluid (e.g., steam) may exit through outlet 14 in casing 7. The center line (CL) 16 of the HP section 6 and LP section 4 is shown as a reference point. Both LP section 4 and HP section 6 can include diaphragm assemblies, which are contained within segments of casing 7.

Figure 2:
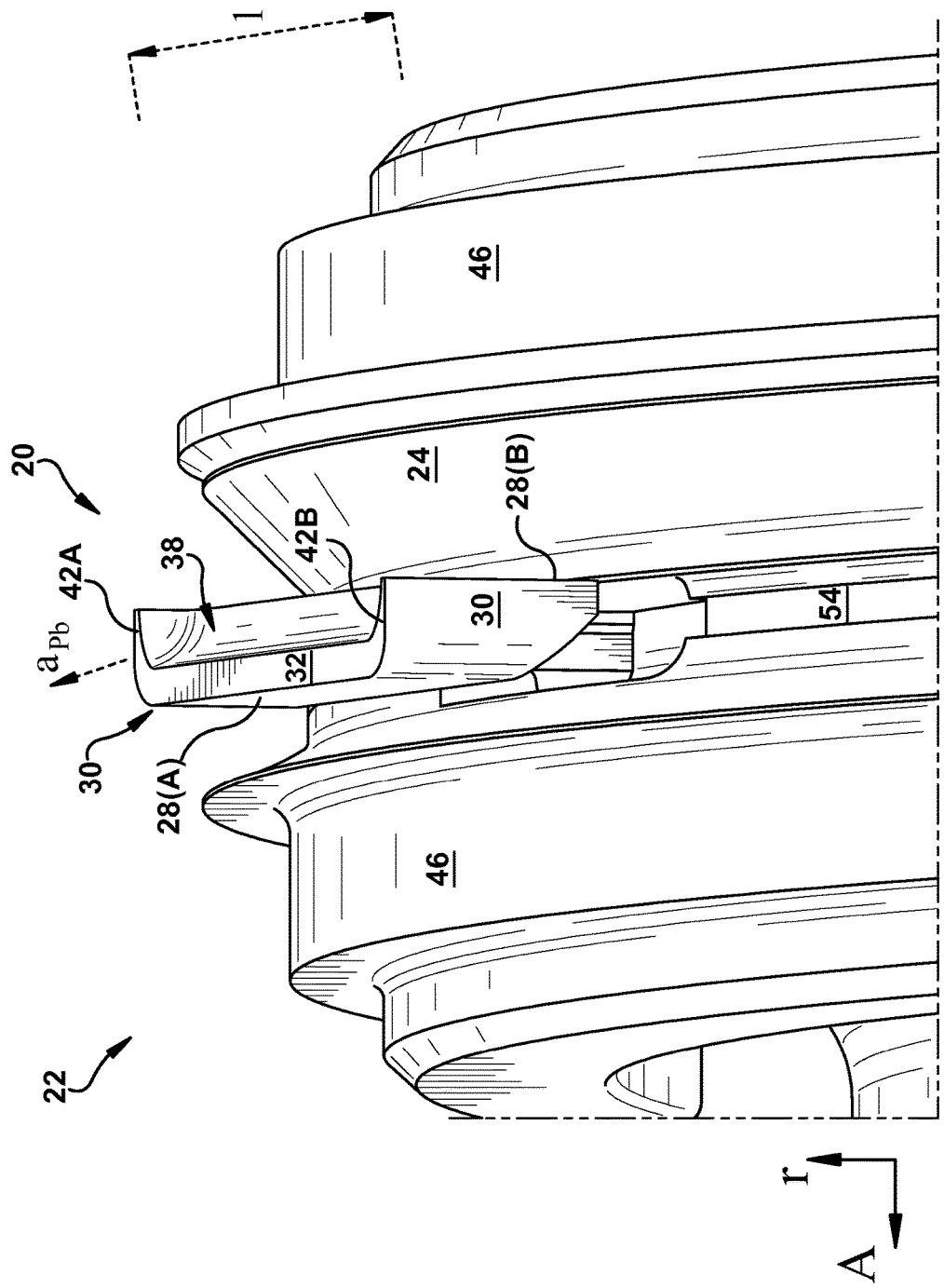
FIG. 2 shows a schematic three-dimensional perspective view of a portion of a steam turbine rotor assembly including a key member according to various embodiments of the disclosure.
Figure 3:
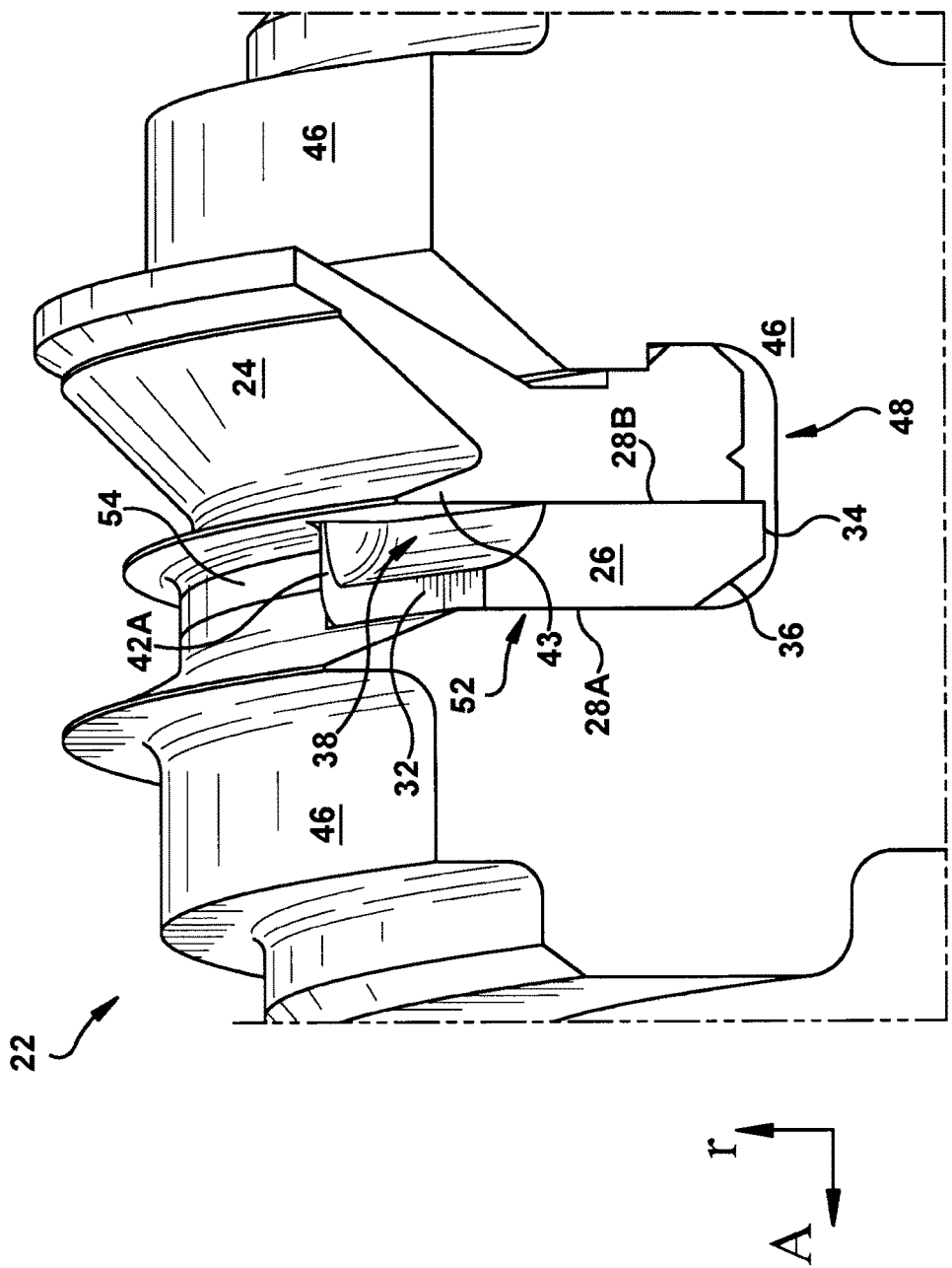
FIG. 3 shows a schematic cut-away perspective view of a portion of a steam turbine rotor assembly according to various embodiments of the disclosure.
Figure 4:
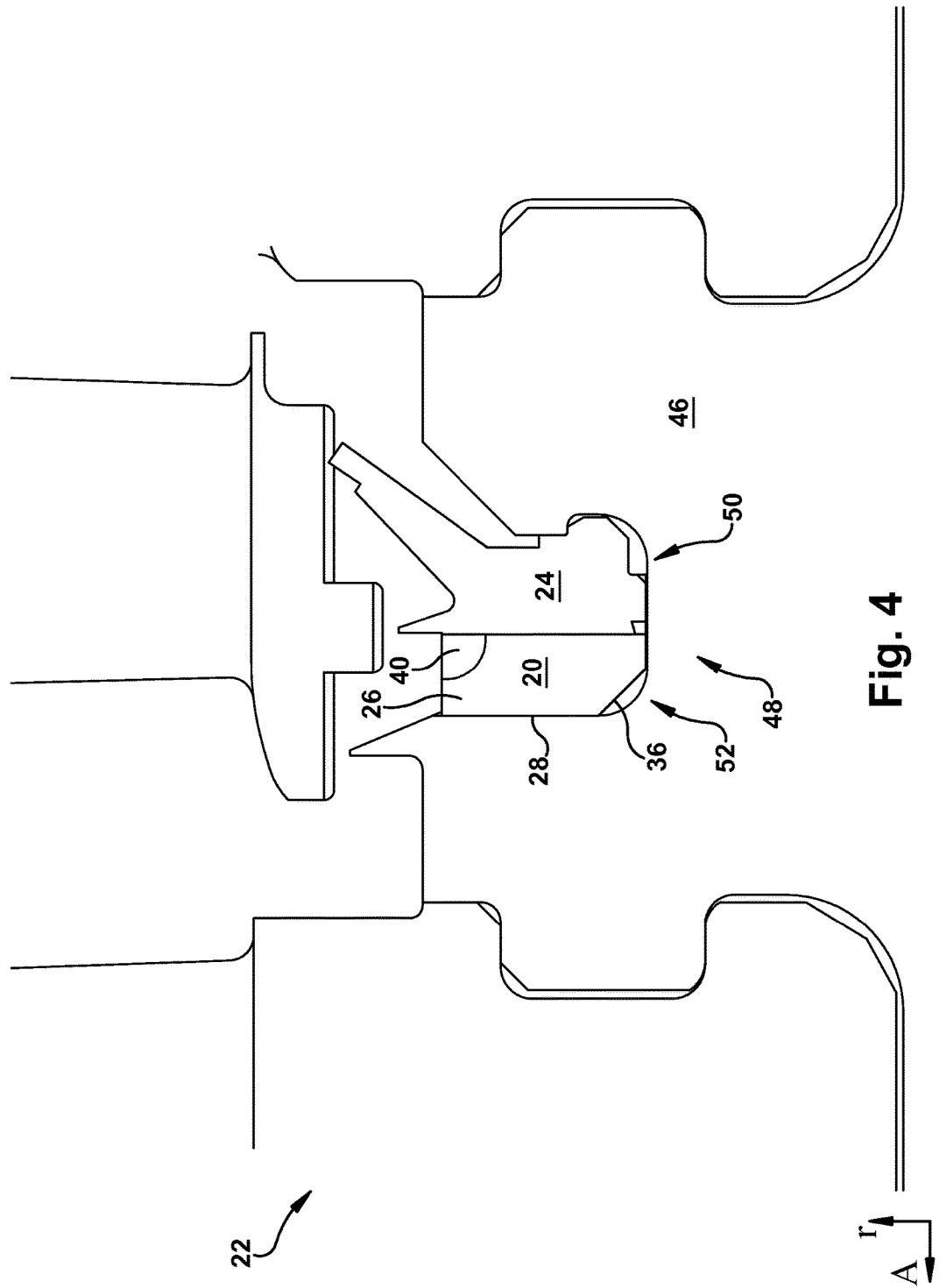
FIG. 4 shows a schematic cut-away view of a steam turbine rotor assembly according to various embodiments of the disclosure.

FIG. 2 shows a schematic three-dimensional view of a rotor key member 20, removed from a steam turbine rotor assembly (or, "rotor assembly") 22, according to various embodiments. FIG. 3 shows the rotor assembly 22 of FIG. 2, in a cut-away perspective view, illustrating the rotor key member 20 inserted in rotor assembly 22. FIG. 4 shows a cut-away side view of the rotor assembly 22, further including a weld 40 securing the rotor key member 20 as described herein.

As shown in FIGS. 3-4, rotor key member 20 is configured to retain a circumferential seal 24 in a steam turbine (e.g., in a rotor assembly 22 within a steam turbine, such as steam turbine 2). With reference to FIGS. 2-4, rotor key member 20 is shown including a body 26 having a primary axis ($a_{Pb}$) extending in a direction substantially perpendicular to an axial direction (A) in the rotor assembly 22 (where axial direction, A coincides with axis of rotation in steam turbine 2). Body 26 can include a first pair of opposing sides 28, a second pair of opposing sides 30, a top surface 32 and a bottom surface 34 extending between the second pair of opposing sides 30. Body 26 can also include a fillet, bevel or chamfer edge 36 extending between a first one (28A) of the first pair of opposing sides 28 and the bottom surface 34, where the fillet, bevel or chamfer edge 36 extends an entire length of the body 26 along the primary axis ($a_{Pb}$).

According to various embodiments, rotor key member 20 can include a slot 38 within body 26. The slot 38 can extend a portion of a length (l) of the body 26 along the primary axis ($a_{Pb}$) between the second pair of opposing sides 30, where slot 38 forms an opening in a second one (28B) of the first pair of opposing sides 28. In various embodiments, as illustrated in FIG. 4, the rotor key member 20 can further include a weld 40 substantially filling slot 38. In various embodiments, weld 40 can include at least one of a tungsten inert gas (GTAW) weld, a metal inert gas (GMAW) weld, or a laser weld, and can be formed after body 26 is positioned adjacent circumferential seal 24 (within slots, described further herein). As can be seen from FIGS. 2-4, in some cases, the slot 38 does not extend an entirety of the length (l) of body 26, such that two distinct portions 42A, 42B of the second one (28B) of the first pair of opposing sides 28 borders slot 38, forming a pocket in which weld 40 can be formed. In various embodiments, slot 38 extends through top surface 32 of body 26, forming a fluid channel between the second one (28B) of the first pair of opposing sides 28 and top surface 32 whereby weld 40 (weld material) can flow. In some cases, as described herein, weld 40 contacts circumferential seal 24, joining body 26 with circumferential seal 24. However, in other embodiments, weld 40 can contact at least one of the rotor body 46 or an adjacent seal retaining member 54, as discussed further herein.

Figure 5:
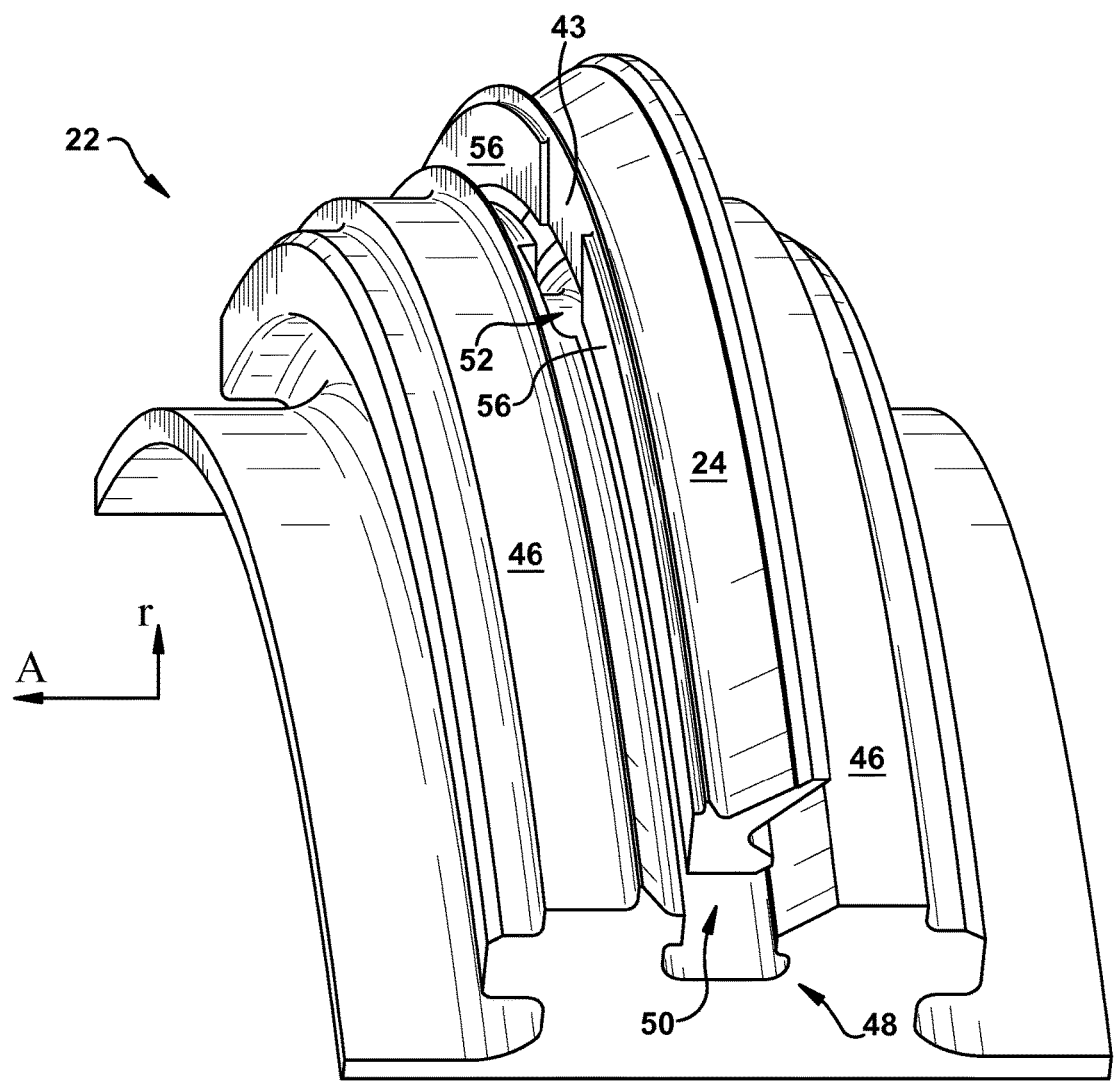
FIG. 5 shows a schematic three-dimensional perspective view of the rotor assembly of FIG. 4, excluding the rotor key member, according to various embodiments of the disclosure.
Figure 6:
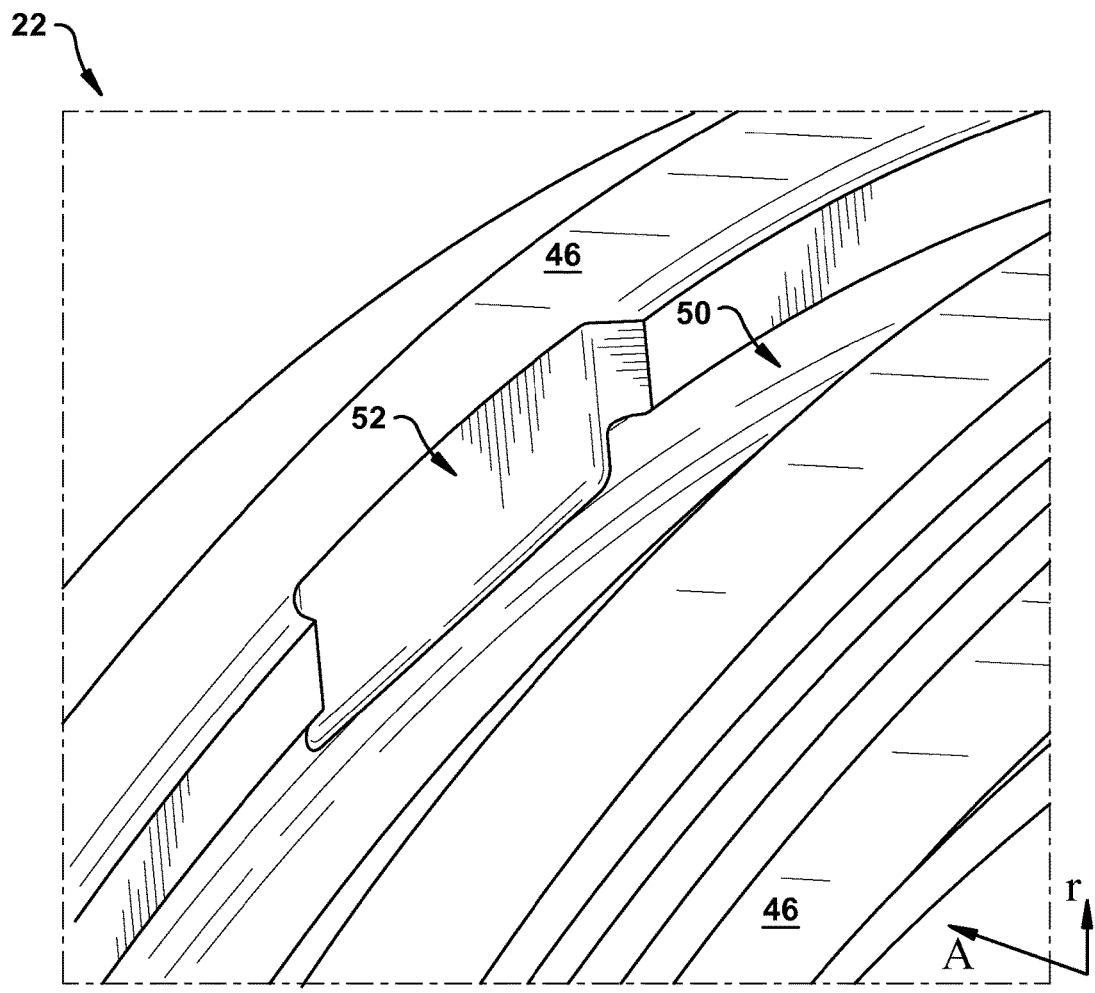
FIG. 6 shows a three-dimensional perspective view of a portion of the rotor assembly of FIG. 4, excluding the circumferential seal and rotor key member, according to various embodiments of the disclosure.
Figure 7:
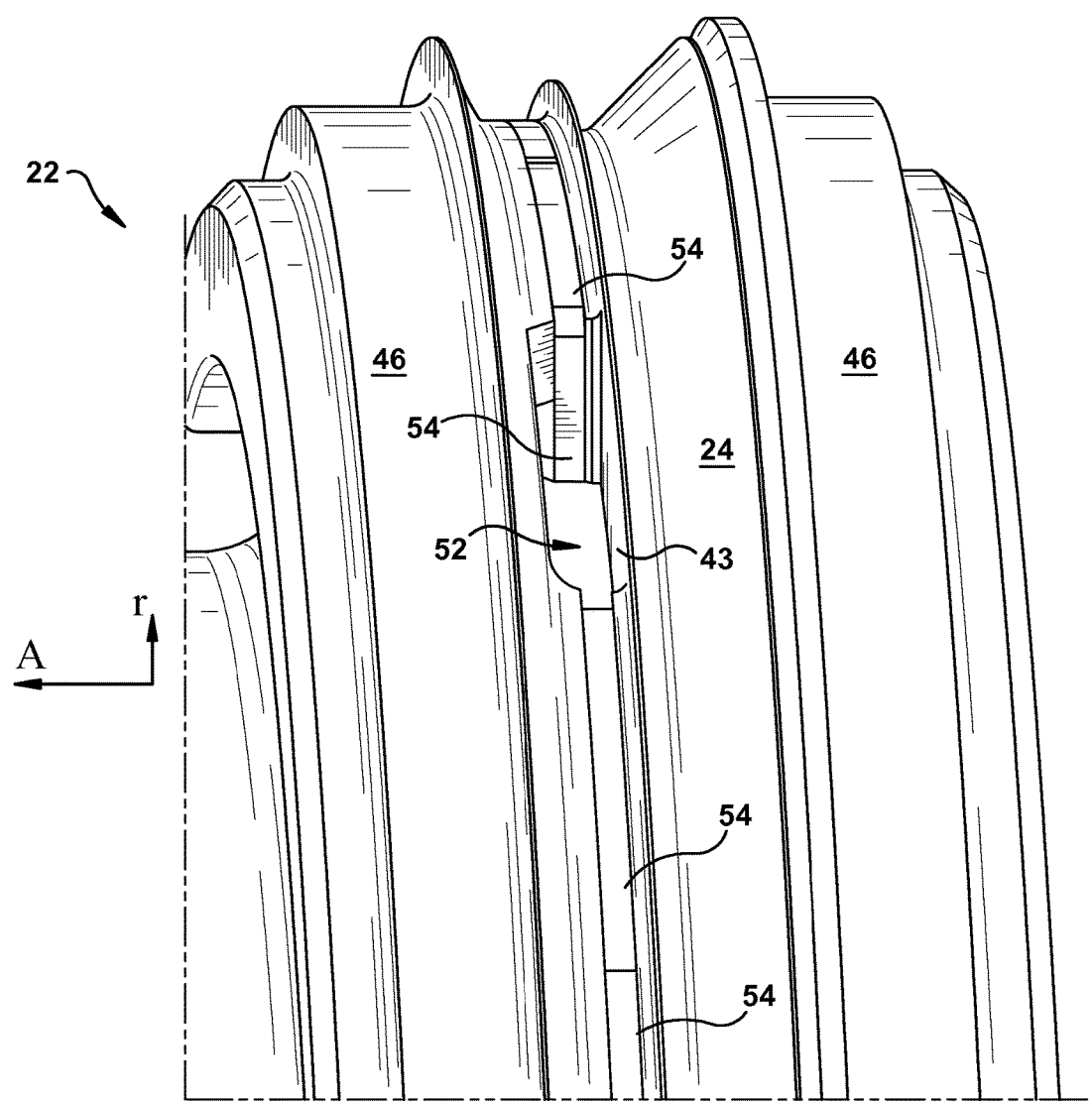
FIG. 7 shows a three-dimensional perspective view of a portion of the rotor assembly of FIG. 4, excluding the rotor key member, but further including a seal retaining member, according to various embodiments of the disclosure.
Figure 8:
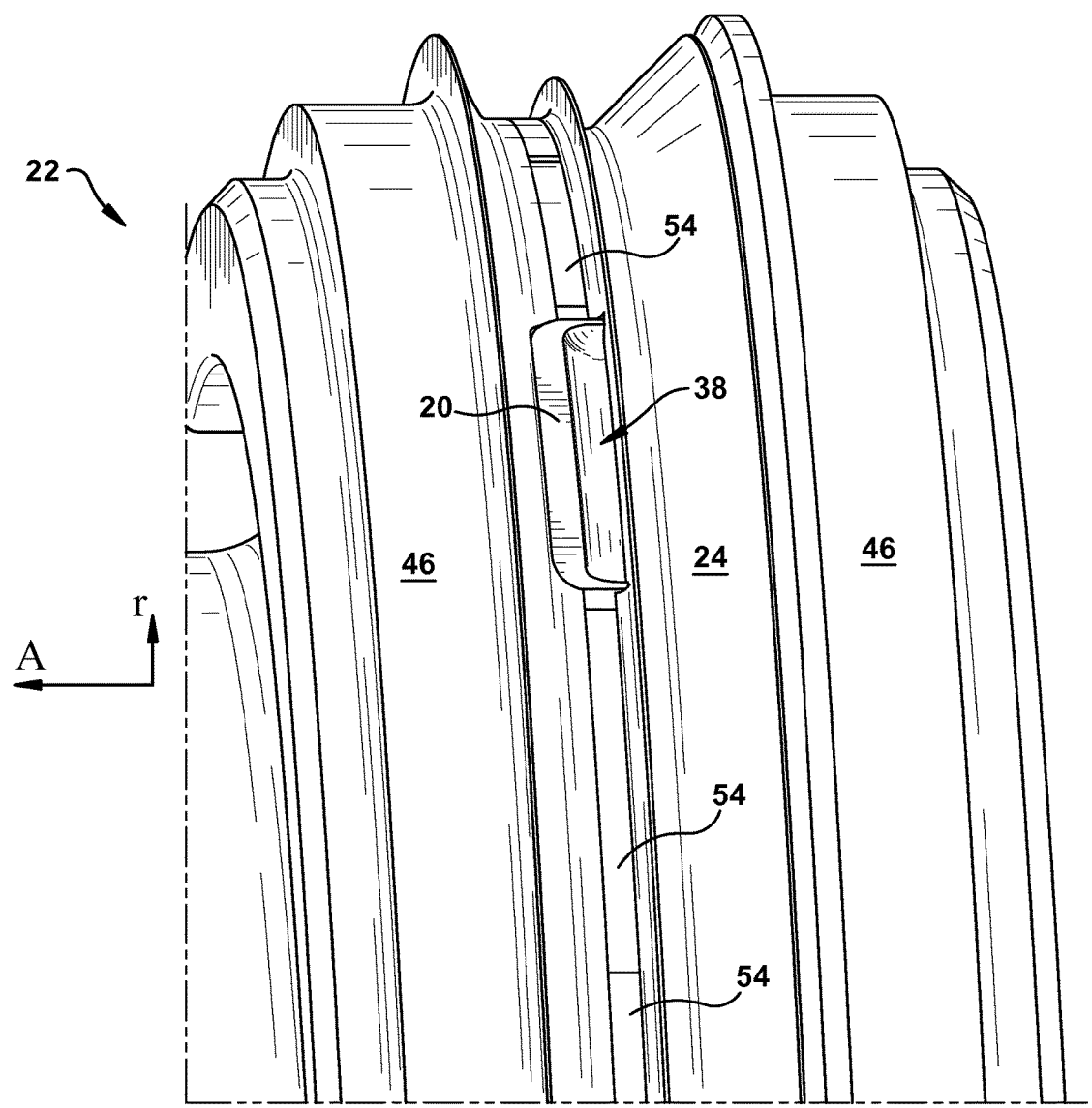
FIG. 8 shows a three-dimensional perspective view of a portion of a rotor assembly according to various embodiments of the disclosure.

FIG. 5 shows a schematic three-dimensional perspective view of the rotor assembly 22 of FIG. 4, excluding rotor key member 20. FIG. 6 shows a three-dimensional perspective view of a portion of rotor assembly 22, excluding circumferential seal 24 and rotor key member 20. FIG. 7 shows a three-dimensional perspective view of a portion of rotor assembly 22, excluding rotor key member 20, but further including seal retaining members 54, as described herein. FIG. 8 shows the rotor assembly 22, including circumferential seal 24, seal retaining members 44 and rotor key member 20, without weld 40.

Returning to FIG. 3, but with continuing reference to FIGS. 5-8, rotor assembly 22 is shown including a rotor body 46 having a slot 48 extending substantially entirely circumferentially about a primary axis (A) of the rotor body 46 (primary axis A corresponding with axis of rotation of steam turbine). Slot 48 can include a primary slot 50 extending substantially an entire circumferential distance about rotor body 46, and a secondary slot 52 (FIGS. 5, 6 and 7) extending axially from primary slot 50 and spanning only a portion of the circumferential distance about rotor body 46. As shown in FIG. 3, rotor assembly 22 can further include circumferential seal 24 within primary slot 50, spanning substantially the entire circumferential distance about rotor body 46 (e.g., in sections or as one continuous piece of material). FIGS. 7 and 8 illustrate additional components in rotor assembly 22, including a set of seal retaining members 54 (e.g., a plurality, circumferentially disposed) within primary slot 50 contacting an axial face 56 of circumferential seal 24. As shown in FIG. 8, rotor key member 20 is located within (and substantially fills) secondary slot 52, and contacts axial face 56 of circumferential seal 24. Rotor key member 20 may be sized to slide into or out of secondary slot 52 to lock circumferential seal 24, e.g., using among other things, weld 40 to engage (couple with) circumferential seal 24. As described herein, the U-shaped feature of rotor key member 20, along with its flexible composition, can allow the rotor key member 20 to be inserted/removed from secondary slot 52 in order to lock/unlock seal retaining members 54 (and in turn, circumferential seal 24). As shown in FIG. 5 and FIG. 7, in some embodiments, circumferential seal 24 can include a recess 43 extending only partially circumferentially, marking a break between adjacent segments of axial face 56. In some cases, this recess 43 can be sized to accommodate rotor key member 20, and coincide with secondary slot 52. That is, in various embodiments, the rotor key member 20 substantially fills recess 43 to restrict circumferential seal 24 from circumferential movement.

During operation of steam turbine 2, rotor assembly 22 can retain circumferential seal 24 by placing axial pressure on axial face 56. In particular, seal retaining members 54 can place axial pressure on circumferential seal (at axial face 56), while rotor key member 20 locks seal retaining members 54 circumferentially in place. Additionally, rotor key member 20 engages the axial face of circumferential seal 24 within recess 43, restricting rotation of circumferential seal 24 relative to rotor body 46. Even further, weld 40 can engage radially inner surface of circumferential seal 24, to inhibit axial rotation of that circumferential seal 24 relative to rotor body 46. It is understood that according to various embodiments, rotor key member 20 (and rotor assembly 22) can be utilized in a plurality of stages within a steam turbine (e.g., steam turbine 2), and can aid in both assembly/disassembly of circumferential seal components, as well as reduce wear and complications from component failure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor key member for retaining a circumferential seal in a steam turbine, the rotor key member comprising:
    a body having a primary axis extending in a direction substantially perpendicular to an axial direction in the steam turbine, the body including:
        a first pair of opposing sides;
        a second pair of opposing sides extending between the first pair of opposing sides;
        a top surface and a bottom surface extending between the second pair of opposing sides; and
        a fillet, bevel or chamfer edge extending between a first one of the first pair of opposing sides and the bottom surface and extending an entire length of the body along the primary axis; and
    a slot within the body, the slot extending a portion of a length of the body along the primary axis between the second pair of opposing sides and forming an opening in a second one of the first pair of opposing sides.

2. The rotor key member of claim 1, further comprising a weld substantially filling the slot.

3. The rotor key member of claim 2, wherein the weld includes at least one of a tungsten inert gas (TIG) weld or a metal inert gas (MIG) weld.

4. The rotor key member of claim 1, wherein the slot does not extend an entirety of the length of the body along the primary axis such that two distinct portions of the second one of the first pair of opposing sides borders the slot.

5. The rotor key member of claim 1, wherein the slot extends through the top surface of the body.

6. The rotor key member of claim 5, wherein the slot forms a fluid channel between the second one of the pair of opposing sides and the top surface.

7. A steam turbine rotor assembly comprising:
    a rotor body having a slot extending substantially entirely circumferentially about a primary axis of the rotor body, the slot including:
        a primary slot extending substantially an entire circumferential distance about the rotor body; and
        a secondary slot extending axially from the primary slot and spanning only a portion of the circumferential distance about the rotor body;
    a circumferential seal within the primary slot spanning substantially the entire circumferential distance about the rotor body;
    a set of seal retaining members within the primary slot contacting an axial face of the circumferential seal; and
    a rotor key member within the secondary slot contacting the axial face of the circumferential seal, the rotor key member for retaining the circumferential seal within the primary slot, wherein the axial face of the circumferential seal includes a recess spanning a portion of the circumferential distance about the rotor body, wherein the rotor key member substantially fills the recess to restrict the circumferential seal from circumferential movement.

8. The steam turbine rotor assembly of claim 7, wherein the rotor key member includes:
   a body having a primary axis extending in a direction substantially perpendicular to an axial direction in the steam turbine, the body including:
      a first pair of opposing sides substantially parallel with the primary axis;
      a second pair of opposing sides extending between the first pair of opposing sides in a direction substantially perpendicular to the first pair of opposing sides;
      a top surface and a bottom surface extending between the second pair of opposing sides in a direction substantially parallel with the primary axis; and
      a fillet, bevel or chamfer edge extending between a first one of the first pair of opposing sides and the bottom surface and extending an entire length of the body along the primary axis; and
   a slot within the body, the slot extending a portion of a length of the body along the primary axis between the second pair of opposing sides and forming an opening in a second one of the first pair of opposing sides.

9. The steam turbine rotor assembly of claim 8, wherein the slot does not extend an entirety of the length of the body along the primary axis such that two distinct portions of the second one of the first pair of opposing sides borders the slot.

10. The steam turbine rotor assembly of claim 8, further comprising a weld substantially filling the slot, the weld contacting at least one of the rotor body, the circumferential seal or one of the set of seal retaining members.

11. The steam turbine rotor assembly of claim 10, wherein the weld includes at least one of a tungsten inert gas (TIG) weld or a metal inert gas (MIG) weld.

12. The steam turbine rotor assembly of claim 8, wherein the slot extends through the top surface of the body.

13. The steam turbine rotor assembly of claim 12, wherein the slot forms a fluid channel between the second one of the pair of opposing sides and the top surface.

14. A steam turbine comprising:
   a casing; and
   a rotor assembly at least partially contained within the casing, the rotor assembly having:
      a rotor body having a slot extending substantially entirely circumferentially about a primary axis of the rotor body, the slot including:
         a primary slot extending substantially an entire circumferential distance about the rotor body; and
         a secondary slot extending axially from the primary slot and spanning only a portion of the circumferential distance about the rotor body;
      a circumferential seal within the primary slot spanning substantially the entire circumferential distance about the rotor body;
      a set of seal retaining members within the primary slot contacting an axial face of the circumferential seal; and
      a rotor key member within the secondary slot contacting the axial face of the circumferential seal, the rotor key member for retaining the circumferential seal within the primary slot,
      wherein the axial face of the circumferential seal includes a recess spanning a portion of the circumferential distance about the rotor body, wherein the rotor key member substantially fills the recess to restrict the circumferential seal from circumferential movement.

15. The steam turbine of claim 14, wherein the rotor key member includes:
   a body having a primary axis extending in a direction substantially perpendicular to an axial direction in the steam turbine, the body including:
      a first pair of opposing sides substantially parallel with the primary axis;
      a second pair of opposing sides extending between the first pair of opposing sides in a direction substantially perpendicular to the first pair of opposing sides;
      a top surface and a bottom surface extending between the second pair of opposing sides in a direction substantially parallel with the primary axis; and
      a fillet, bevel or chamfer edge extending between a first one of the first pair of opposing sides and the bottom surface and extending an entire length of the body along the primary axis; and
   a slot within the body, the slot extending a portion of a length of the body along the primary axis between the second pair of opposing sides and forming an opening in a second one of the first pair of opposing sides.

16. The steam turbine of claim 15, wherein the slot does not extend an entirety of the length of the body along the primary axis such that two distinct portions of the second one of the first pair of opposing sides borders the slot.

17. The steam turbine of claim 15, further comprising a weld substantially filling the slot.

18. The steam turbine of claim 15, wherein the slot extends through the top surface of the body, wherein the slot forms a fluid channel between the second one of the pair of opposing sides and the top surface.

* * * * *